United States Patent [19]

Schmidlin

[11] Patent Number: 4,647,179
[45] Date of Patent: Mar. 3, 1987

[54] DEVELOPMENT APPARATUS

[75] Inventor: Fred W. Schmidlin, Pittsford, N.Y.

[73] Assignee: Xerox Corporation, Stamford, Conn.

[21] Appl. No.: 614,499

[22] Filed: May 29, 1984

[51] Int. Cl.<sup>4</sup> ............................................. G03G 15/00
[52] U.S. Cl. ................................ 355/3 DD; 198/576;
361/212; 355/3 R
[58] Field of Search ................. 141/DIG. 1; 198/576,
198/690, 679; 355/3 DD, 3 R, 16, 3 BE;
361/212

[56] References Cited

U.S. PATENT DOCUMENTS

| | | | |
|---|---|---|---|
| 3,113,042 | 12/1963 | Hall | 198/690 |
| 3,778,678 | 12/1973 | Masuda | 317/3 |
| 3,801,869 | 4/1974 | Masuda | 317/3 |
| 3,872,361 | 3/1975 | Masuda | 317/262 E |
| 4,265,990 | 5/1981 | Stolka et al. | 430/59 |

OTHER PUBLICATIONS

FX/4072, Fuj Xerox Patent Appln., Filed 5/7/81; Title; "Toner Supply Device", in the name of Shizuo Sagami et al.
Ser. No. 567,840, D/83129 Xerox Patent Appln. Filed Jan. 3, 1984, in the name of Joseph Mammino et al. entitled "Imaging System".

Primary Examiner—A. T. Grimley
Assistant Examiner—David Warren

[57] ABSTRACT

Toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

21 Claims, 6 Drawing Figures

DEVELOPMENT APPARATUS

This invention relates to printing machines, and more particularly, to a toner conveyor for transporting toner from a supply to a development station where the toner is used to form powder images on substrates positioned at the development station.

By way of example, the present invention will be disclosed in connection with a machine wherein the well known xerographic process is utilized. The invention as will be appreciated is however not limited to such environments. In the art of xerography or other similar image reproducing arts, a latent electrostatic image is formed on a charge-retentive surface such as a photoconductor which generally comprises a photoconductive insulating material adhered to a conductive backing. The photoconductor is first provided with a uniform charge after which it is exposed to a light image of an original document to be reproduced. The latent electrostatic images, thus formed, are rendered visible by applying any one of numerous pigmented resins specifically designed for this purpose. In the case of a reusable photoconductive surface, the pigmented resin, more commonly referred to as toner which formes the visible images, is transferred to plain paper.

It should be understood that for the purposes of the present invention, which relates to transporting toner to a development station for the purpose of forming powder images thereat, the latent electrostatic images discussed above may be formed by means other than by the exposure of an electrostatically charged photosensitive member to a light image of an original document. For example, the latent electrostatic image may be generated from information electronically stored or generated, and the digital information may be converted to alphanumeric images by image generation electronics and optics. However, such electronic and optic devices form no part of the present invention. Moreover, while the present invention is herein disclosed in connection with images formed xerographically the formation of the images on non-charged plain paper is also contemplated.

In the application of the toner to the latent electrostatic images contained on the charge-retentive surface, it is necessary to transport the toner from a developer housing to the surface. A basic limitation of conventional xerographic development systems, including both magnetic brush and single component, is the inability to deliver toner(i.e. charged pigment) to the latent images without creating large adhesive forces between the toner and the conveyor which transport the toner to latent images. As will be appreciated, large fluctuation (i.e. noise) in the adhesive forces that cause the pigment to tenaciously adhere to the carrier severely limit the sensitivity of the developer system thereby necessitating higher contrast voltages forming the images. Accordingly, it is desirable to reduce such noise particularly in connection with latent images formed by contrasting voltages.

In order to minimize the creation of such fluctuation in adhesive forces, I have provided, in the preferred embodiment of my invention a toner conveyor including means for generating travelling electrostatic waves which can move the toner about the surface of the conveyor with minimal contact therewith.

The travelling wave is generated by alternating voltages of three or more phases applied to a linear array of conductors placed abut the outer periphery of the conveyor. The force F for moving the toner about the conveyor is equal $QE_t$ where Q is the charge on the toner and $E_t$ is the tangential field supplied by a multi-phase a.c. voltage applied to the array of conductors. Toner is presented to the conveyor by means of a magnetic brush which is rotated in the same direction as the travelling wave. As will be apparent, other methods could be employed. This gives an initial velocity to the toner particles which enables toner having a much lower charge to be propelled by the wave.

Travelling waves have been employed for transporting particulate material, for example, U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, non-uniform electric field that repels electrically charged particles axially inwardly and tends to propel them along the path.

U.S. Pat. No. 3,778,678 also issued to Masuda relates to a similar device as that disclosed in the aforementioned '361 patent.

U.S. Pat. No. 3,801,869 issued to Masuda discloses a booth in which electrically charged particulate material is sprayed onto a workpiece having an opposite charge, so that the particles ar electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5–10 KV) operated at a relatively low frequency, i.e. 50 Hz, for generating his travelling waves. In a confined area such as a tube or between parallel plates the use of high voltages is tolerable and in the case of the '869 patent even necessary since a high voltage is required to charge the initally uncharged particles.

The movement of toner for use in a xerographic development system is also known, as disclosed in FX/4072 (Fuji Xerox's Japanese patent application) filed in Japan on May 7, 1981, a copy of which is enclosed. In that application, there is disclosed a device comprising an elongated conduit which utilizes travelling waves for transporting toner from a supply bottle to a toner hopper.

Applicant's invention in contrast to the devices described above uses a conveyor having a linear electrode array disposed adjacent the outer surface thereof. The electrodes forming the array are coextensive with the longitudinal axis of the conveyor and they are connected to a relatively low voltage (i.e. 30–1000 volts) source operated at a relatively higher frequency, for example, 1 Kc. The toner transported by the conveyor to the image receiving surface is moved about the circumference thereof from the toner supply to the area of the surface, movement being caused by the travelling electrostatic or electrodynmic waves generated by the electrode array. The toner particles are continuously scattered off the surface of the grid so that they bounce along making a miniature cloud of toner which extends above the surface approximately one wavelength. In the direction of motion, the clouds are about ⅛ to ¼ of a wavelength long, so the clouds are actually tall and skinny. Only the particles closer to the surface actually collide with the surface.

Other aspects of the present invention will become apparent as the following description proceeds with reference to the drawings wherein.

Inasmuch as the art of electrophotographic printing is well known, the various processing stations employed in the printing machine illustrated in FIG. 1 will be described only briefly.

Figure 1:
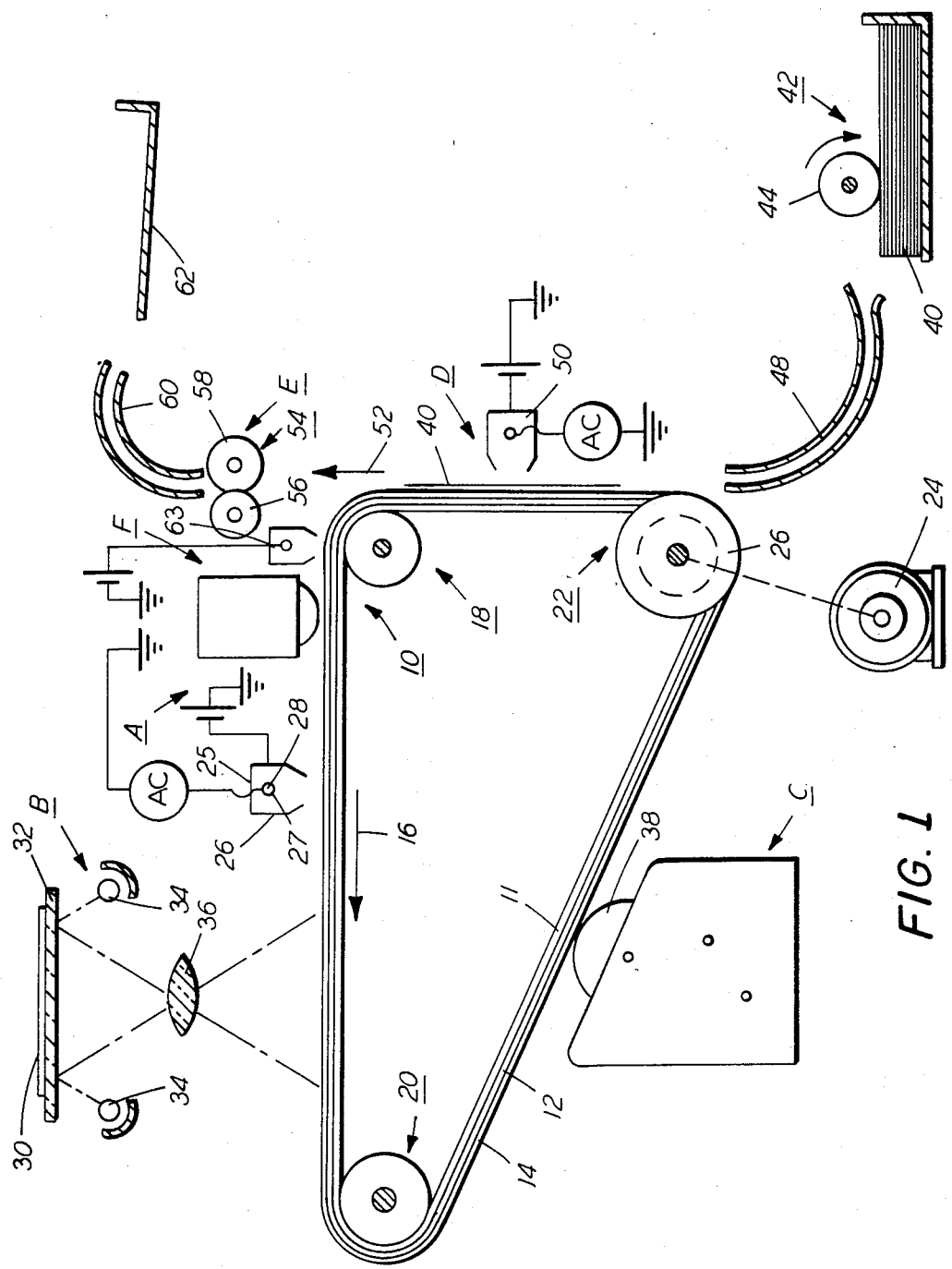
FIG. 1 is a schematic elevation view depicting an electrophotographic printing machine incorporating the present invention.

As shown in FIG. 1, the printing machine utilizes a photoconductive belt 10 which consists of an electrically conductive substrate 11, a charge generator layer 12 comprising photoconductive particles randomly dispersed in an electrically insulating organic resin and a charge transport layer 1 comprising a transparent electrically inactive polycarbonate resin having dissolved therein one or more diamines. A photoconductive belt of the foregoing type belt is disclosed in U.S. Pat. No. 4,265,990 issued May 5, 1981 in the name of Milan Stolka et al, the disclosure of which is incorporated herein by reference. Belt 10 moves in the direction of arrow 16 to advance successive portions thereof sequentially through the various processing stations disposed about the path of movement thereof.

Belt 10 is entrained about stripping roller 18, tension roller 20 and drive roller 22. Roller 22 is coupled to motor 24 by suitable means such as a drive chain.

Belt 10 is maintained in tension by a pair of springs (not shown) which resiliently urge tension roller 20 against belt 20 with the desired spring force. Both stripping roller 18 and tension roller 20 are rotatably mounted. These rollers are idlers which rotate freely as belt 20 moves in the direction of arrow 16.

With continued reference to FIG. 1, initially a portion of belt 10 passes through charging station A. At charging station A, a corona device indicated generally by reference numeral 25 charges the layer 12 of belt 10 to a relatively high, substantially uniform negative potential.

A suitable corona generating device for negatively charging the photoconductive belt 10 comprises a conductive shield 26 and corona wire 27, the latter of which is coated with an electrically insulating layer 28 having a thickness which precludes a net d.c. corona current when an a.c. voltage is applied to the corona wire when the shield and photoconductive surface are at the same potential.

Next, the charged portion of the photoconductive belt is advanced through exposure station B. At exposure station B, an original document 30 is positioned face down upon a transparent platen 32. The light rays reflected from original document 30 form images which are transmitted through lens 36. The light images are projected onto the charged portion of the photoconductive belt to selectively dissipate the charge thereon. This records an electrostatic latent image on the belt which corresponds to the informational area contained within original document 30.

Thereafter, belt 10 advances the electrostatic latent image to development station C. At development station C, a travelling wave conveyor 38 advances non-insulative toner particles into contact with the electrostatic latent images formed on the photoconductive belt 10. The latent images attract the toner particles from the charged toner conveyor therby forming toner images on the photoconductive belt.

Belt 10 then advances the toner powder image to transfer station D. At transfer station D, a sheet of support material 40 is moved into contact with the toner powder images. The sheet of support material is advanced to transfer station D by a sheet feeding apparatus 42. Preferably, sheet feeding apparatus 42 includes a feed roll 44 contacting the upper sheet of stack 46. Feed roll 44 rotates so as to advance the upper most sheet from stack 46 into chute 48. Chute 48 directs the advancing sheet of support material into contact with the belt 10 in a timed sequence so that the toner powder image developed thereon contacts the advancing sheet of support material at transfer station D.

Transfer station D includes a corona generating device 50 which sprays ions of a suitable polarity onto the backside of sheet 40 so that the toner powder images are attracted from photoconductive belt 10 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder images to sheet 40. Preferably, fuser assembly 54 includes a heated fuser roller 56 adapted to be pressure engaged with a backup roller 58 with the toner powder images contacting fuser roller 56. In this manner, the toner powder images are permanently affixed to sheet 40. After fusing, chute 60 guides the advancing sheet 40 to catch tray 62 for removal from the printing machine by the operator.

Figure 2:
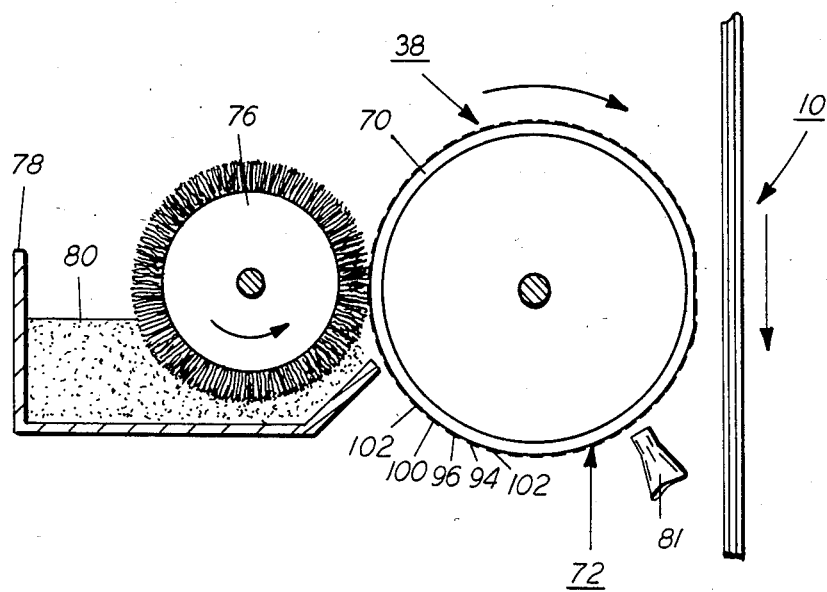
FIG. 2 is a schematic illustration of a travelling wave conveyor system used in the machine of FIG. 1.

The travelling wave conveyor 38 comprises, as illustrated in FIG. 2, a base member 70 on which there is carried a linear electrode array generally indicated by reference numeral 72. The base member 70 preferably has a generally cylindrical shape. The conveyor is adapted to transport the toner particles clockwise about the periphery thereon in a manner to be discussed hereinbelow. Of course, the particles could also be moved in the opposite direction. The toner particles are delivered to the conveyor via a magnetic brush 76 which is mounted for rotation in the direction of the arrow in a developer housing 78 containing toner particles 80. The brush is adapted to be rotated by a drive (not shown) in the same direction as the travelling wave to thereby deposit toner on the conveyor. The travelling waves then carry the toner about the surface of the conveyor. A vacuum device 81 is provided for removing non-transferred toner.

The electrode array 72 preferably comprises a four-phase grid structure comprising electrodes 94, 96, 100 and 102 having a voltage source 82 (FIG. 6) operatively connected thereto in the manner shown in order to supply a voltage in the order of 30–1000 volts a.c. The electrodes are connected to the voltage source via phase shifting circuitry (see FIG. 6) such that a travelling wave pattern is established. The electostatic field forming the travelling wave pattern pushes the charged toner particles about the surface of the conveyor from the donor roll or magnetic brush 76 (FIG. 2) to the belt 10 where they are transferred to the latent electrostatic images on the belt due to the attraction of the image field on the belt.

Figure 3:
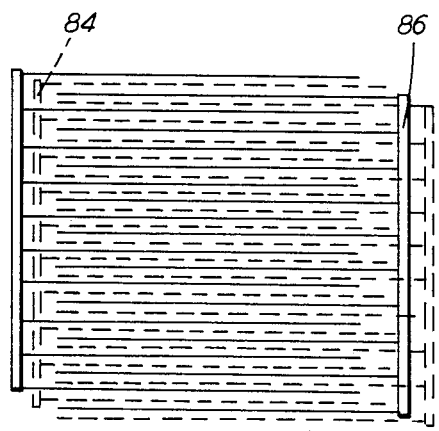
FIG. 3 is a schematic plan view of a grid structure used in the conveyor system of FIG. 2.

A four phase grid structure such as the array 72 may comprise, as disclosed in FIG. 3, two two-phase integrated electrode arrays 84 and 86, respectively etched on opposite sides of a thin metal clad foil. The two-phase patterns are identical and made from the same master. The pattern on the one side is displace vertically, i.e. perpendicular to the lines, a half of the center-to-center distance between the lines on one side. The same pattern, on the opposite side, is also shown displaced horizontally. However, this is optional. This displacement minimizes the interelectrode capacitance and reduces the possibility of electrical short circuits.

Figure 4:
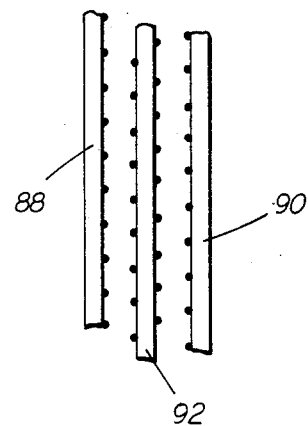
FIG. 4 is a schematic plan view of phototools used for fabricating the grid structure of FIG. 3 with a foil disposed therebetween.

A grid structure of the type shown in FIG. 3, may be made by using phototools 88 and 90 (FIG. 4) which form respectively the back and front patterns thereof. These phototools have interdigited arrays facing each other. Phototools can be precisely matched, displaced and pinned. A foil 92 with a metal and photoresist on both sides thereof may be interposed between phototools. the phototools are pressed together and then exposed. Subsequent development and etching completes the formation of the grid depicted in FIG. 2. If desirable, contact pads can be incorporated in the phototools or may be added later by metal evaporation.

Figure 5:
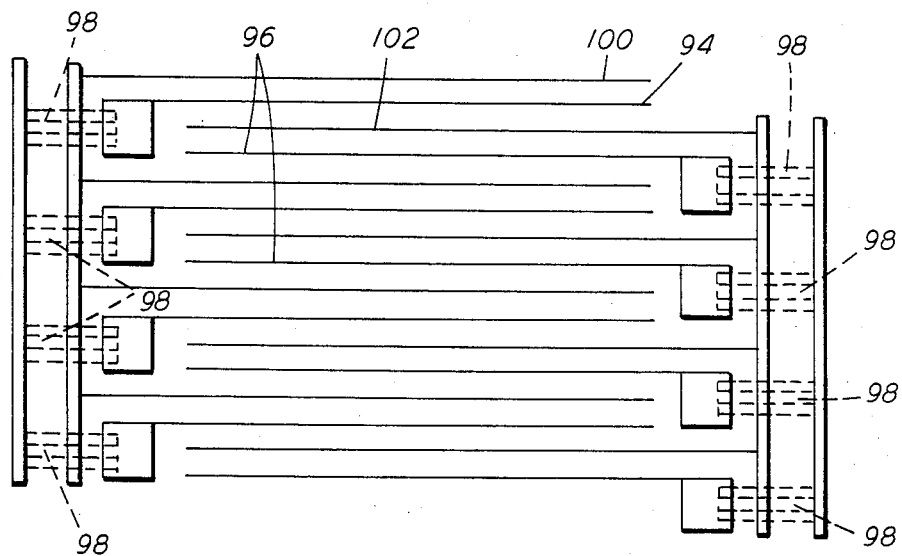
FIG. 5 is an alternate embodiment of the grid structure used in FIG. 3.

FIG. 5 depicts another type of grid structure that can be readily fabricated. In this case, all four electrodes patterns are coplanar. The circuit can be photofabricated using a single mask. However, electrodes 94 and 96 are connected only to pads which have to be interconnected. These interconnections can be constructed by metal evaporation through a shadow mask, indicated by reference numeral 98, by wire bonding, or by metal deposition through holes in the photoresist layer. Wire 100 and wire 102 are also connected to the appropriate pads. All the photoresist layers are aligned with the pads for electrodes 94 and 96. The advantage of this latter technique is that the alignment of the interconnections requires only one-fourth the precision required for the grid lines compared to the embodiment of FIG. 2.

Figure 6:
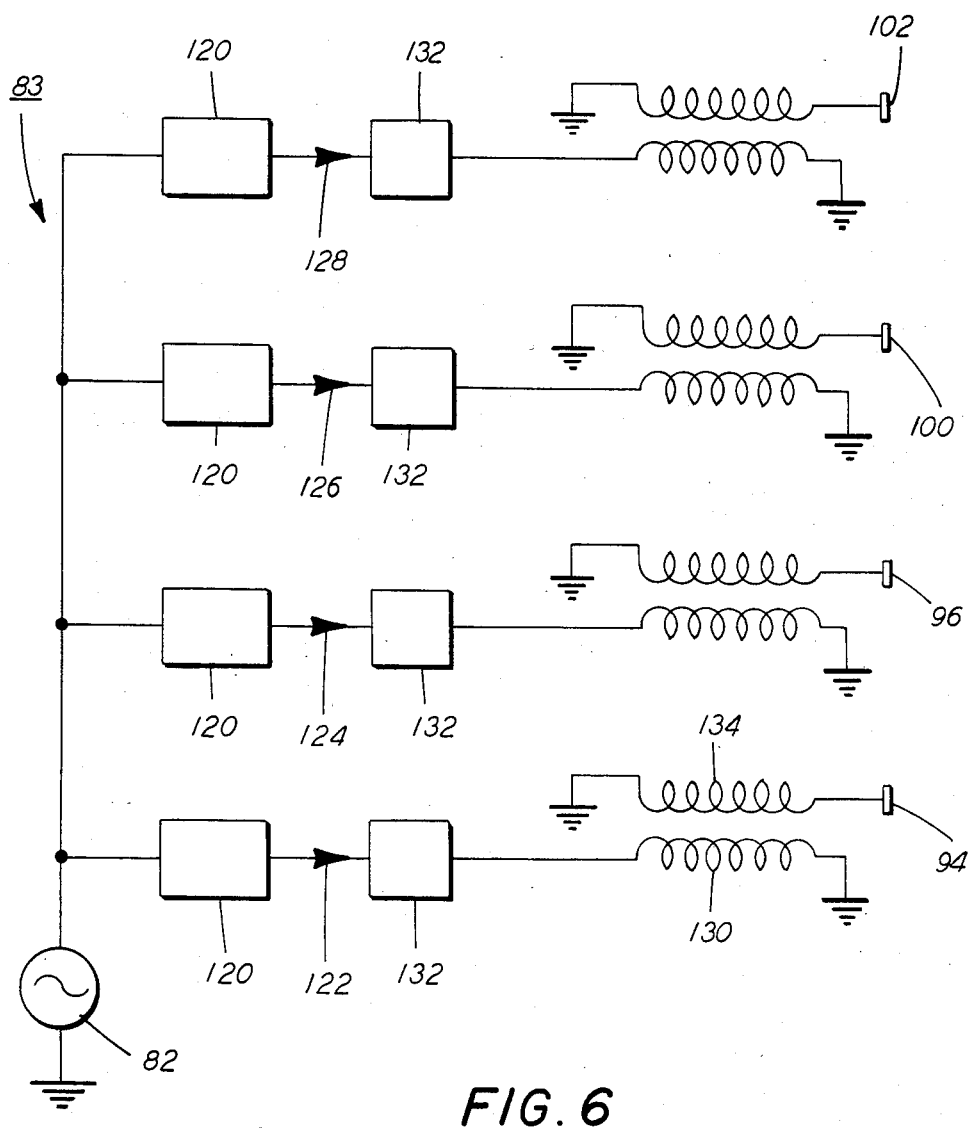
FIG. 6 is a schematic illustration of a multi-phase voltage circuit for energiziang the electrodes of the travelling wave conveyor system of the invention.

As illustrated in FIG. 6, the voltage source 82 is connected to the electrodes such that each phase thereof is connected to every fourth electrode. Each successive voltage phase is 90 degrees out of phase with the next phase, either advanced or retarded, depending on the desired direction of toner movement. The voltage source 82 forms part of a control circuit generally indicated by reference character 83. The circuit also comprises a phase shifting components indicated in block form by reference character 120. The phase shifting circuit may comprise a plurality of operational amplifiers and associated circuitry, not shown which serve to produce four phase shifted outputs 122, 124, 126 and 128. Each of the outputs is operatively connected to a primary winding of a transformer, for example, winding 130 via an audio amplifier, for example, amplifier 132. The secondary 134 of the transformer is connected to the electrode 94. Similarly, phase shifting circuitry is connected to the electrodes 96, 100 and 102.

A typical width for each of the electrodes is 1 to 4 mils. Typical spacing between the centers of the electrodes is twice the electrode width and the spacing between adjacent electrodes is approximately the same as the electrode width. Typical operating frequency is between 1000 and 10,000 Hz for 125 lpi grids (4 mil electrodes), the drive frequency for maximum transport rate being 2,000 Hz.

While the electrodes may be exposed metal such as Cu or Al it is preferred that they be covered or overcoated with a thin oxide or insulator layer. A thin coating having a thickness of about hald of the electrode width will sufficiently attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred covercoating layer comprises a strongly injecting active matrix such as the disclosed in D/83129 (Assignee's file number) filed in the U.S. patent Office in the name of Joseph Mammino et al on or about Dec. 30, 1983 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

As can now be appreciated, there has been disclosed a toner conveyor which is capable of transporting toner from a supply thereof to an imaging surface which may comprise a charge-retentive surface without creating large adhesion forces between the toner particles and the conveyor. In the case of xerographically formed images, the electrostatic forces forming the latent images can be substantially less than those of prior art devices in order to effect transfer of the toner particles from the conveyor to the images resulting in a development system that is more sensitive than those of the prior art thereby allowing for the formation of latent electrostatic images with lower contrast voltages.

I claim:

1. Charged toner transport apparatus for presenting already charged toner to an elongated image receiving surface;

a base member having a portion thereof supported adjacent said elongated image receiving surface and a portion thereof adjacent a supply of toner particles remote from said elongated image receiving surface, said base number delimiting a path through which said toner moves from the latter to the former;

a linear electrode array carried on the outer surface of said base member, said array comprising a plurality of spaced apart electrodes extending substantially across the entire width of said base member which is substantially coextensive with the width of said elongated imaging surface; and a source of a.c. multi-phase voltage operatively connected to said electrode array, the phases being shifted with respect to each other such as to create an electordynamic wave pattern capable of moving toner particles from said supply to said surface, the magnitude of said voltage and the spacing of said electrodes being such as to cause intermittent contact of only some of said already charged toner with said linear electrode array.

2. Appartus according to claim 1 wherein said a.c. voltage is relatively low.

3. Apparatus according to claim 1 wherein said voltage is less than 2 KV.

4. Apparatus according to claim 3 wherein said voltage is operated at a frequency of 1000 Hz or greater.

5. Apparatus according to claim 1 including an overcoat layer on said electrodes, said overcoating layer being substantially non-tribo active with respect to the toner.

6. Apparatus according to claim 5 wherein the spacing between electrodes is approximately equal to the width thereof.

7. Apparatus according to claim 6 wherein the spacing between centers of said electrodes is in the order of 1–5 mils.

8. Apparatus according to claim 7 wherein the width of each electrode is in the order of 1–5 mils.

9. Apparatus according to claim 8 wherein said electrodes are coplanar.

10. Apparatus according to claim 1 wherein said linear array comprises a four phase grid structure including two 2-phase integrated electrode arrays, respectively etched on opposite sides of a thin metal clad foil, the two-phase patterns being identical and the pattern on one side being displaced a quarter of the center-to-center distance between electrodes.

11. Apparatus according to claim 10 wherein said a.c. voltage is relatively low.

12. Apparatus according to claim 11 wherein said voltage is less than 2 KV.

13. Apparatus according to claim 12 wherein said voltage is operated at a frequency of about 1000 Hz.

14. Apparatus according to claim 13 including an overcoat layer on said electrodes, said overcoat layer being substantially non-tribo active with respect to the toner.

15. Apparatus according to claim 14 wherein the spacing between electrodes is approximately equal to the width thereof.

16. Apparatus according to claim 15 wherein the spacing between centers of said electrodes is in the order of 1–5 mils.

17. Apparatus according to claim 16 wherein the width of each electrode is in the order of 1–5 mils.

18. Apparatus according to claim 1 including a rotatable brush supported in contact with said supply of toner particles for presenting toner to said base member.

19. Apparatus according to claim 18 wherein said brush is rotated in the direction of the direction of movement of said travelling waves.

20. Apparatus according to claim 19 wherein the images on said imaging surface are electrostatic images formed by contrasting voltages.

21. Apparatus according to claim 1 wherein said base member has a generally cylindrical configuration.

* * * * *